US005600552A

United States Patent [19]
McCavit et al.

[11] Patent Number: 5,600,552
[45] Date of Patent: Feb. 4, 1997

[54] DIRECT CURRENT POWER SUPPLY FOR USE IN SERIES WITH A LOAD IN AN ALTERNATING CURRENT CIRCUIT

[75] Inventors: Kim I. McCavit, St. Joseph; Bradford B. Jensen, Berrien Springs, both of Mich.

[73] Assignee: Heath Company, Benton Harbor, Mich.

[21] Appl. No.: 397,838

[22] Filed: Mar. 2, 1995

[51] Int. Cl.⁶ .................................................. H02M 7/06
[52] U.S. Cl. ........................................ 363/89; 363/126
[58] Field of Search ........................... 363/89, 125, 126, 363/127

[56] References Cited

U.S. PATENT DOCUMENTS

| Re. 29,048 | 11/1996 | Brown | 363/84 |
|---|---|---|---|
| 4,359,681 | 11/1982 | Baker et al. | 323/320 |
| 4,504,778 | 3/1985 | Evans | 323/323 |
| 4,559,594 | 12/1985 | Sears et al. | 363/126 |
| 4,618,770 | 10/1986 | Maile | 250/338 |
| 4,639,612 | 1/1987 | Bowman-Jones | 307/132 E |
| 4,650,986 | 3/1987 | Maile | 250/214 SW |
| 4,713,598 | 12/1987 | Smith | 323/245 |
| 4,874,962 | 10/1989 | Hermans | 307/116 |
| 5,359,277 | 10/1994 | Cowett | 363/79 |

Primary Examiner—Jeffrey L. Sterrett
Attorney, Agent, or Firm—O'Malley and Firestone

[57] ABSTRACT

A DC power supply for an electronic switching element connected in series with a load in an AC main has a rectifying element and a capacitor parallel to the electronic switching element. Charging of the capacitor is provided by opening the switching element and diverting current from the AC main through the rectifying element and capacitor. The voltage difference across the capacitor powers control circuitry for the electronic switching element. Hysteresis built into the control circuitry results in the electronic switching element opening at a lower voltage difference across the capacitor than the voltage difference required to close the electronic switching element.

13 Claims, 2 Drawing Sheets

DIRECT CURRENT POWER SUPPLY FOR USE IN SERIES WITH A LOAD IN AN ALTERNATING CURRENT CIRCUIT

BACKGROUND OF THE INVENTION

1. Field of the Invention

The present invention relates to an apparatus and method for supplying direct current (DC) from the main of an alternating current (AC) line without connection of the main to the return side or common of the AC line or to safety ground.

2. Background to the Invention

Household and commercial power distribution wiring is typically locally controlled through simple mechanical wall switches placed in one line of a two line AC distribution system. Generally one line comprises two wires with the first wire being a hot feed into a box for the wall switch and the second wire connecting the box to the controlled load, e.g. a lighting fixture. Generally the other side of the load is connected to a neutral line or leg of the AC power supply called the common which does not return to the wall switch box.

It may be desirable to substitute electronic switching devices for the simple mechanical wall switches to provide automatic functions which the mechanical wall switch cannot support. An example of such a device is an electronic motion sensor for activating room lighting when a room is occupied. The electronic control circuitry for such a device requires DC power. Deriving the DC power from the AC line serves user convenience and is more economical than use of batteries for the electronic circuit or providing a household DC power system. As only one leg of the AC system is generally routed through the switch box, any local DC power supply using the household system must provide for supplying DC from a single line of the AC system, i.e. without connection to the neutral leg of the AC system. The power supply must also be maintained both when fixture is on and when it is off.

U.S. Pt. No. 4,874,962 ('962 patent) teaches one such power supply. The power supply component of the circuit of the '962 patent is connected between the hot leg of the AC system and earth ground. For a variety of reasons, electrical codes have long strictly limited leakage current to ground. In the '962 patent a neon lamp is included in the current path of the power supply circuitry to limit current to under 500 µA, the code limit. Among the advantages of this arrangement are that no current need be drawn by the load to power the power supply circuitry. A disadvantage of the solution proposed by the '962 patent is that deliberate leakage of current to ground is not always desirable even if within code limits. The use of a neon lamp to limit current also adds to the expense of the circuit.

More commonly, DC power is tapped from an AC line by inductively coupling the DC power supply circuitry to the AC line or by connecting the power supply in series with the load in the AC line. In such an arrangement, the load must draw some current if DC power is to be available whenever needed. Of course a load is not normally drawing current when "off". In practice this means that current trickles through the AC line when the load is off. The AC circuit should be a low impedance circuit when the load is fully powered to avoid heat generation and power waste in the DC power supply and an extremely high impedance device when the load is off to minimize current in the line.

U.S. Pat. No. 4,713,598 (the '598 patent) teaches a DC power supply connected in series with a load in a leg of an AC building power distribution system. In the '598 patent a relay switch and the primary winding of a current transformer provide the main conduction path to the load when the load is powered for use. The position of the relay circuit controls the current path through the current transformer. When the relay is open, parts of or all of both the primary winding and the secondary winding and a capacitor are connected in series with the load. The combination of windings and capacitor are relatively high in impedance compared with the load reducing current in the line to a low level or trickle current and reducing the voltage drop across the load substantially. For practical purposes, the load is no longer on when a trickle current is being sent through the load. The trickle current is tapped from the current transformer, which now functions as a voltage dividing impedance. The tapped trickle current powers the DC supply. The current transformer is connected to rectification circuitry to provide the DC supply. The circuit of the '598 patent taps the AC line for power on every cycle of the AC current.

The problems presented by putting a DC supply circuit in series with the load in a AC line are well known. The circuitry tends to introduce additional noise on the line reducing power quality. The line always draws some power. The power supply circuit can reduce maximum voltage across the load, possibly reducing its efficiency and producing visible effects on lighting intensity.

SUMMARY OF THE INVENTION

It is one object of the invention to provide an AC excited DC power supply for connection in series with a load in an AC line.

It is another object of the invention to provide a DC power supply which minimizes effects on operation of a load in an AC circuit including the DC power supply.

It is a still further object of the invention to provide a DC power supply of reduced cost.

Additional effects, features and advantages will be apparent in the written description that follows. The DC power supply according to the invention provides an electronic switching element connected in series with a load in an AC main. A rectifying element and a capacitor are placed in parallel with the electronic switching element. Charging of the capacitor is provided by opening the switching element and diverting current from the AC main through the rectifying element and capacitor. The voltage difference across the capacitor powers control circuitry for the electronic switching element. Hysteresis built into the control circuitry results in the electronic switching element opening at a lower voltage difference across the capacitor than the voltage difference required to close the electronic switching element.

DETAILED DESCRIPTION OF THE INVENTION

Figure 1:
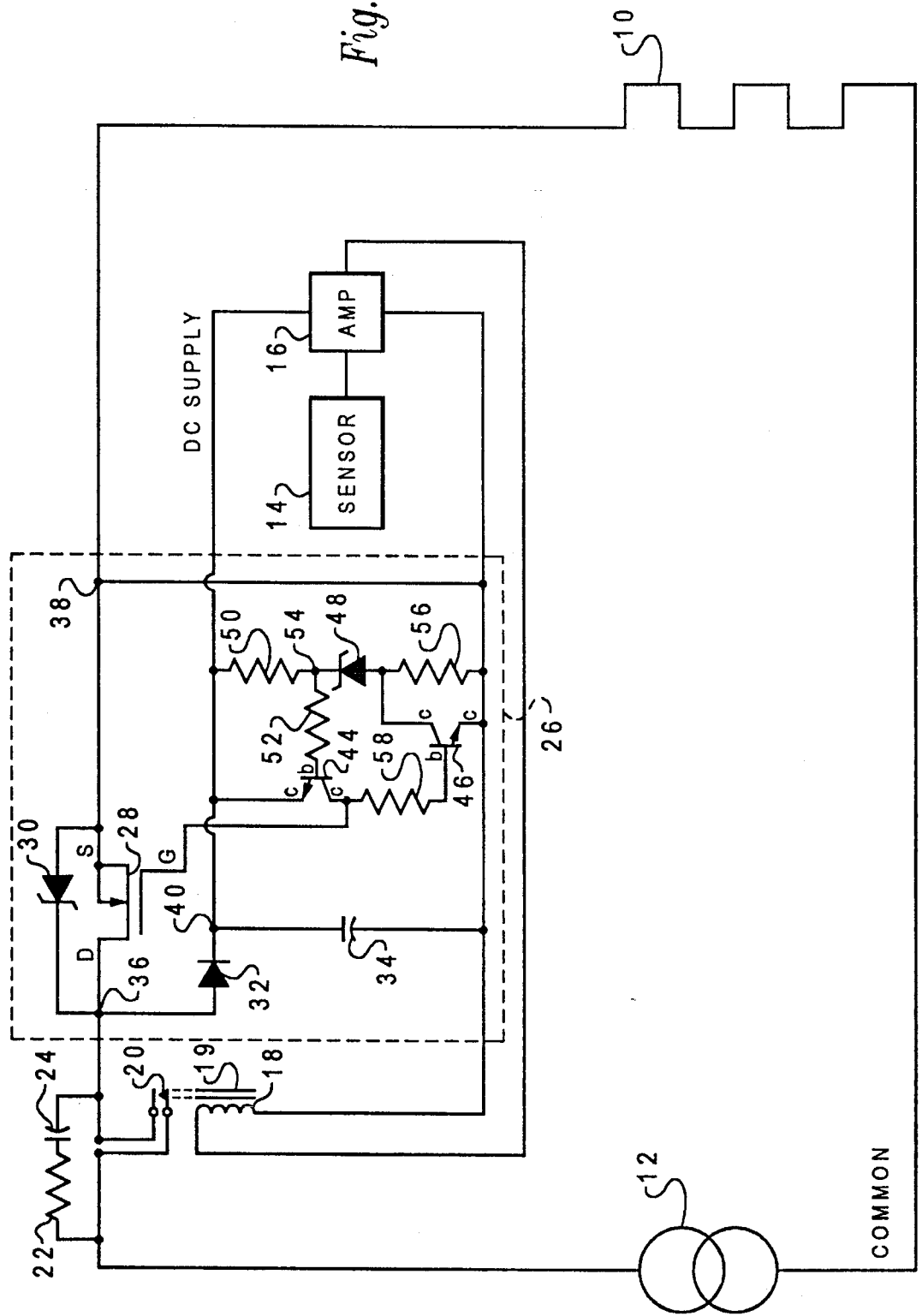
FIG. 1 is a circuit schematic of a first embodiment of the invention.

As shown in FIG. 1 a load 10 is connected between a hot or main line and an alternating current (AC) common to an AC source 12. Load 10 may be an illumination source for an area where light is provided automatically whenever the area is occupied. Load 10 is turned on and off upon detection of a person in the area. Detection is provided by a sensor 14, such as an infrared detector, a motion sensor, or similar device. The output of sensor 14 is applied to an amplifier 16 which in turn drives a solenoid coil 18 for closing and opening the contacts 20 of a mechanical relay 19. Closing contacts 20 allows AC power to flow to load 10. Opening contacts 20 prevents such flow except for a trickle current, which flows through a resistor 22 and a capacitor 24 which are connected in series with one another parallel to mechanical relay contacts 20. Resistor 22 and capacitor 24 together provide a high impedance in series with load 10 when relay 19 is open, reducing the voltage drop across load 10 to a low enough value that the load appears off.

Amplifier 16 and possibly sensor 14 require a source of direct current (DC) power for operation. The power requirements of the sensing and control circuitry are small compared with the power demands of load 10. DC power supply 26 shows one embodiment of the present invention and is adapted for inclusion with a mechanical relay and associated control circuitry in a wall switch box (not shown). As described above, the AC common is not typically available within a wall switch box. DC power supply 26 includes a solid state switch, such as a power Metal-oxide semiconductor field effect transistor (MOSFET) 28 connected in series with mechanical relay contacts 20 and load 10 in the powered line of an AC distribution system. Power MOSFET 28 switches current to DC power supply 26 when DC power supply 26 requires power from the AC main line.

A protective Zener diode 30 may be connected to conduct current from the source to the drain of power MOSFET 28. This protects MOSFET 28 from high voltage transients when it is in cutoff and provides a supplementary current path parallel to the drain to source diode of MOSFET 28 from load 10 to AC source 12 during negative half cycles. In most applications Zener diode 30 may be omitted. If MOSFET 28 is off during a negative half cycle of the AC line, current is conducted by the integral reverse diode of the MOSFET, and by Zener diode 30, if present.

To draw power from the AC main line, power MOSFET 28 is turned off, preventing current from flowing from AC source through the MOSFET to load 10 during positive AC half cycles. When MOSFET 28 is in cutoff, a current path from node 36 to node 38 is provided through a rectifying diode 32 and capacitor 34 during positive half cycles of the AC. Current flow through capacitor 34 charges the capacitor. When MOSFET 28 is on, capacitor 34 acts as the DC source with a DC output node 40 between the capacitor and diode 32.

The switching of MOSFET 28 is provided by a switching control network. The primary criteria determining switching of MOSFET 28 are keeping the voltage level at node 40 within minimum and maximum bounds and avoiding producing any observable effect on the operation of load 10. Switching of MOSFET 28 should also be immune to AC line noise to avoid power dissipation in MOSFET 28 that would result from frequent switching. Power MOSFET 28 has a negligible voltage drop when current is flowing through it. The same is not true of the current path including diode 32 and capacitor 34. The voltage drop across capacitor 34 easily exceeds 10 volts. Were capacitor 34 charged during the period of maximum voltage of an AC half cycle, the peak to peak voltage of the AC would be reduced by over 10 volts. This is enough to effect luminance intensity. Charging cycles of power supply 26 typically occur from about one in every ten to one in every hundred cycles during on operation of a load, or from about six times a second to once every one and a half seconds. Were the load an illumination source and charging consistently occurred at the peak of the half cycle, a noticeable flicker in illumination intensity could occur. Fortunately, in most applications, MOSFET switching occurring within positive half cycles of the AC occurs substantially randomly within the positive going AC half cycles. When the MOSFET switches off during a negative half cycle the charging cycle occurs at the beginning of the positive half cycle of the AC and does not effect peak to peak voltage. In either case power is diverted to the charging circuitry for capacitor 34 for only a small portion of an AC high cycle when load 10 is on. As a result, effects on luminance intensity of load 10 are rarely seen. However, the circuits disclosed here could be modified to synchronize charging of capacitor 34 with, for example, the beginning of the AC positive going half cycles to maintain consistent peak to peak voltages across load 10.

The switching network provides built in hysteresis to maintain voltage within the desired minimum and maximum bounds. The voltage on DC output node 40 which results in MOSFET 28 turning on is somewhat higher than the voltage which results in MOSFET 28 turning off. The capacitance of capacitor 34 is not so small as to require frequent charging, but not so large that the charging cycle extends over a substantial portion of an AC cycle, or several AC cycles, when load 10 is in use.

The functions of the switching network may be achieved in several ways. In the embodiment of FIG. 1 the emitter of a PNP transistor 44 is connected to DC output node 40. The base of PNP transistor 44 is connected to DC output node 40 by resistor 50, node 54 and resistor 52. A Zener diode 48 is connected between node 54 and the collector of NPN transistor 46 and oriented to conduct reverse breakdown current from node 54 to the collector. A resistor 56 is connected from node 38 to the collector of transistor 46. The collector of transistor 44 is connected to the gate of power MOSFET 28 and to a resistor 58. Resistor 58 is connected between the collector of transistor 44 and the base of transistor 46. The emitter of transistor 46 is connected to node 38.

When Zener diode 48 is not in breakdown operation, transistors 44 and 46 are not conducting. The charge on the gate of MOSFET 28 discharges through resistor 58 and the base to emitter diode of NPN transistor 46, resulting in MOSFET 28 turning off. If the AC circuit including load 10 and AC source 12 is in its positive half cycle, current flows from node 36 through diode 32 and capacitor 34 to node 38, charging the capacitor. With charging of capacitor 34, the voltage on DC output node 40 rises until Zener diode 48 enters reverse breakdown conduction.

When relay contacts 20 are closed, capacitor 34 stores sufficient charge to keep Zener diode 48 in breakdown without frequent recharging of the capacitor. When Zener diode 48 enters breakdown, a small amount of current is drawn from capacitor 34 through Zener diode 48 along a path to node 38 formed by resistor 50, the Zener diode and resistor 56. Current drawn through resistor 50 produces a voltage drop across resistor 50. This in turn forces the voltage level on node 54 negative relative to DC output node 40. The voltage at node 40 is applied to the base of transistor 44 through resistor 52, providing a negative base to emitter voltage on the transistor since the emitter of transistor 44 is connected to DC output node 40. Transistor 44, being a PNP device, is biased on and its collector is pulled high to substantially the voltage level on DC output node 40. The high signal from the collector of transistor 44 is applied to the gate of MOSFET 28 holding the MOSFET on. The signal is also applied through a current limiting resistor 58 to the base of NPN transistor 46 turning transistor 46 on. Transistor 46 functions as a switch, diverting current from resistor 56 to transistor 46. The voltage drop across resistor 56 falls as current through the resistor falls, helping keep Zener diode 48 in breakdown. As a result, the voltage level on DC output node 40 which results in Zener diode 48 leaving breakdown operation is lower than the voltage required to force Zener diode 48 into breakdown and provides the desired hysteresis.

Figure 2:
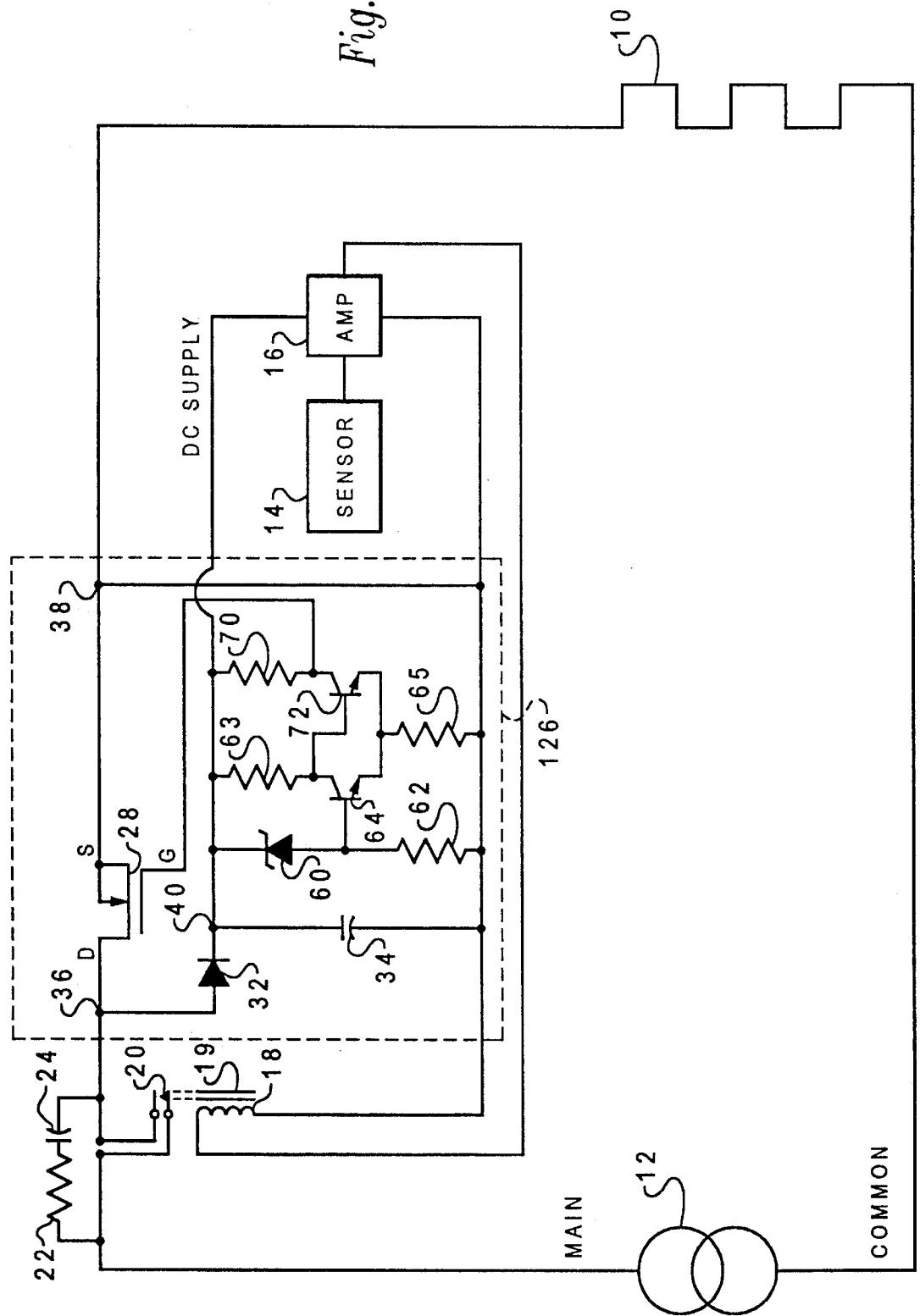
FIG. 2 is a circuit schematic of a second, preferred embodiment of the invention.

FIG. 2 depicts a preferred embodiment of a DC power supply 126 according to the invention wherein like numerals refer to equivalent elements in FIG. 1. DC power supply 126 differs from DC power supply 26 in having a Zener diode 60, oriented to conduct reverse breakdown current from DC output node 40 to the base of transistor 64, connected directly to DC output node 40. A resistor 62 is connected between Zener diode 60 and node 38 to provide a biasing voltage to the base of transistor 64. The biasing voltage on the base of NPN transistor 64 will be the same as the voltage on node 38 when Zener diode 60 is not conducting and will be relatively positive compared with node 38 when Zener diode 60 is conducting.

The collector of transistor 64 is connected to the base of NPN transistor 72 and by resistor 63 to DC output node 40. The emitter of transistor 64 is connected by resistor 65 to node 38. The collector of transistor 72 is connected by resistor 70 to DC output node 40 and the emitter of the transistor is connected by resistor 65 to node 38.

As in the embodiment described with reference to FIG. 1, a power MOSFET 28 is used to divert current through a unidirectional charging path including rectifying diode 32 and capacitor 34. DC voltage appearing on a DC output node 40 is regulated by a Zener diode 60 connected to conduct reverse breakdown current from node 40 through resistor 62 to node 38. When Zener diode 60 is not conducting, the base of NPN transistor 64 is held below the voltage on the emitter of transistor 64. The collector of transistor 64 is pulled high by resistor 63, which is connected between the collector and node 40. The collector of transistor 64 is connected to the base of NPN transistor 72. Since the emitter of transistor 72 is connected to node 38 by resistor 65, the base to emitter voltage difference is positive and the transistor turns on. Current flows from node 40 through resistor 70, transistor 72 and resistor 65. The collector of transistor 72, which is tied to the gate of MOSFET 28, is pulled below the threshold voltage for MOSFET 28. MOSFET 28 is turned off and if the AC is in its positive half cycle, current flows through diode 32 and capacitor 34 charging the capacitor.

As capacitor 34 is charged, the voltage difference between DC output node 40 and node 38 increases until the breakdown voltage of Zener diode 60 is reached. When Zener diode 60 begins reverse conducting, current passes through resistor 62 raising the base to emitter voltage difference on transistor 64. Transistor 64 turns on, pulling the collector of transistor 64 down. The collector of transistor 64 is tied to the base of transistor 72. Thus the voltage on the base of transistor 72 falls relative to the voltage level on the emitter of transistor 72, turning the transistor off. When transistor 72 turns off, the voltage on its collector rises to the level on DC output node 40. This rise in voltage is applied to the gate of MOSFET 28, resulting in MOSFET 28 turning on. AC line current now flows through MOSFET 28 to load 10. MOSFET 28 remains on until the charge on capacitor 34 decays depending on the size of the capacitor and the DC current load.

The basic operation of either embodiment is not dependent on whether relay contacts 20 are closed or opened. However, MOSFET 28 is switched on and off more frequently and it is off for longer periods when relay contacts 20 are open than when closed. This is because of the reduced AC voltage available for charging capacitor 34. The effects of the operation of MOSFET 28 on load 10 are of little consequence when load 10 is nominally off, so the effects of the increased duty cycles can be ignored.

DC power supply 126 provides hysteresis for noise immunity and reducing the switching frequency of MOSFET 28. When Zener diode 60 is in breakdown and transistor 64 is on, current flows through a path formed by resistor 63, transistor 64 and resistor 65. Resistor 65 has a small resistance compared to resistor 63. Resistances of 22 Kohms and 1 Mohm, respectively, work well where Zener diode 60 has a breakdown voltage of 12 volts. The small voltage drop across resistor 65 effectively raises the voltage required to drive Zener diode 60 into reverse breakdown conduction by a small amount over its rated reverse breakdown voltage. The voltage range for DC output node 40 is between approximately 10 and 13 volts. By selecting a resistance for resistor 70, which is less than half that for resistor 63, the potential drop across resistor 65 is raised when transistor 72 is on, as opposed to transistor 64, and current is flowing in a path including resistor 70. Because the resistance of resistor 65 is much less than the resistance for either resistor 63 or resistor 70, the current through resistor 65 approximately doubles when transistor 72 is on as opposed to transistor 64. Thus the voltage level difference between the emitter of transistor 64 and node 38 also approximately doubles when transistor 72 is on instead of transistor 64. Turning transistor 64 on depends upon a minimum base to emitter voltage drop. The voltage drop across resistor 62 must be greater to turn transistor 64 on than to simply keep it on, since the emitter voltage of transistor 64 falls after transistor 72 turns off. Thus the DC output node 40 voltage, which results in transistor 64 turning on, is greater than the voltage which turns the transistor off.

While the invention is shown in only two embodiments, it is not thus limited but is susceptible to various changes and modifications without departing from the spirit and scope of the invention. Those skilled in the art will now recognize that many variations on the circuits shown in FIGS. 1 and 2 which will perform the same functions are possible. In particular electronic switches other than MOSFETs may be used. Control could be carried out using operational amplifiers, microprocessors or other devices. Function could be enhanced using crossover detection circuitry to synchronize capacitor charging operation with the AC if light flicker needed to be controlled.

What is claimed is:

1. A direct current power supply comprising:

a switching element;

first and second nodes for connection into an alternating current line that are selectively connectable by the switching element;

a unidirectional current path connecting the first and second nodes parallel to the switching element;

an intermediate direct current output node in the unidirectional current path; and a voltage regulating element connected to the intermediate direct current output node and responsive to a first voltage level on the intermediate direct current output node for turning the switching element on and to a second voltage level on the intermediate direct current output node for turning the switching element off in an active alternating current line.

2. A direct current power supply as claimed in claim 1, wherein the first voltage level is of greater magnitude relative to ground than is the second voltage level.

3. The direct current power supply of claim 2, wherein the unidirectional current path comprises:

a rectifying element a capacitive element connected in series with the rectifying element; and the intermediate direct current output node is between the rectifying element and the capacitive element.

4. The direct current power supply of claim 3, wherein the voltage regulating element comprises:

a current path including a Zener diode connected between the intermediate direct current output node and the second node; and switching element control circuitry responsive to breakdown conduction of the Zener diode for applying a control signal turning on the switching element.

5. The direct current power supply of claim 4, wherein the switching element control circuitry comprises:

a first transistor having its base connected to the Zener diode and becoming conductive when the Zener diode breaks down;

a second transistor having its base connected to the collector of the first transistor to be nonconducting when the first transistor becomes conducting and conducting when the first transistor is nonconducting; and a resistive voltage divider network connected to the first and second transistors requiring a higher voltage on the intermediate direct current output node to turn the second transistor on than to turn the second transistor off.

6. The direct current power supply of claim 5, further comprising:

a mechanical relay in the alternating current line; and a high impedance current path connected parallel to the mechanical relay.

7. The direct current power supply of claim 5, wherein the switching element is a power MOSFET.

8. A direct current power supply comprising:

first and second nodes for connection into an alternating current main line;

means responsive to a switching signal for selectively connecting the first and second nodes;

a unidirectional current path between the first and second nodes;

an intermediate direct current output node in the unidirectional current path;

means for regulating voltage on the intermediate direct current output node by drawing current from the intermediate node; and the means for regulating voltage including means responsive to the current drawn from the intermediate direct current output node rising to a first threshold for generating a switching signal for closing the means for selectively connecting the first and second nodes and further responsive to the current drawn falling to a second threshold for opening the means for selectively connecting the first and second nodes.

9. The direct current power supply of claim 8, wherein the unidirectional current path comprises:

means for rectifying an alternating current; and means for storing electrical charge connected in series with the means for rectifying an alternating current; and the intermediate direct current output node connects the means for rectifying element and the means for storing charge.

10. A direct current power supply comprising:

an electronic switch in series with a load in an alternating current main;

means for storing energy connected in parallel with the electronic switch;

means responsive to a first energy level stored in the means for storing energy for turning the electronic switch off; and means responsive to a second energy level stored in the means for storing energy for turning the electronic switch on.

11. A direct current power supply as set forth in claim 10, wherein the means for storing energy further comprises:

a rectifying element;

a capacitive element connected in series with the rectifying element.

12. A direct current power supply as set forth in claim 10, further comprising:

a relay in the alternating current main in series with the electronic switch and the load; and circuit means utilizing energy from the means for storing energy for controlling the relay.

13. A direct current power supply as set forth in claim 12, and further comprising:

a high impedance path connected parallel to the relay.

* * * * *